S. LILLY.
POWER TRANSMITTING DEVICE FOR AUTOMOBILE WHEELS.
APPLICATION FILED MAY 24, 1920.
1,354,670. Patented Oct. 5, 1920.
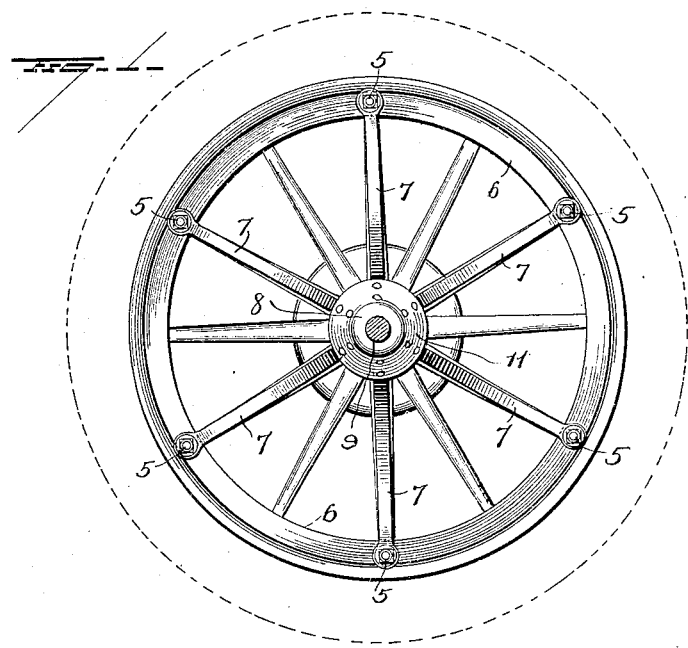
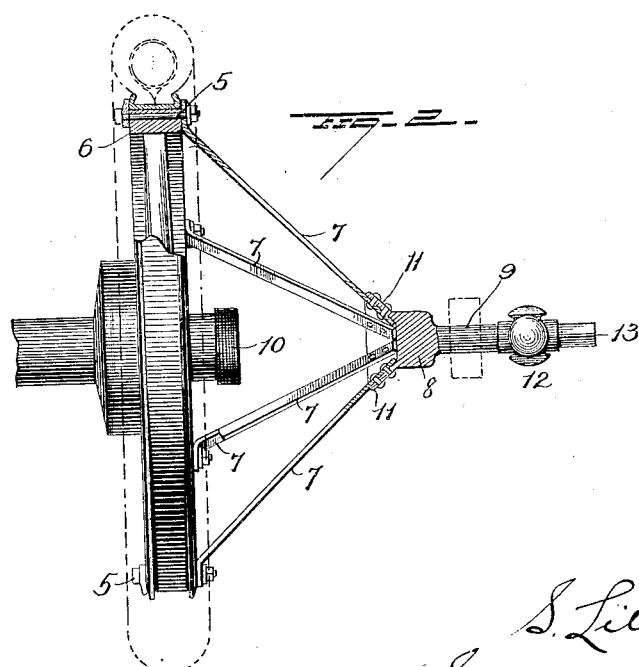
Inventor
S. Lilly
By Seymour & Bright
Attorneys

UNITED STATES PATENT OFFICE.

SAMUEL LILLY, OF MOREHEAD CITY, NORTH CAROLINA.

POWER-TRANSMITTING DEVICE FOR AUTOMOBILE-WHEELS.

1,354,670.   Specification of Letters Patent.   Patented Oct. 5, 1920.

Application filed May 24, 1920. Serial No. 383,837.

*To all whom it may concern:*

Be it known that I, SAMUEL LILLY, a citizen of the United States, and a resident of Morehead City, in the county of Carteret and State of North Carolina, have invented certain new and useful Improvements in Power-Transmitting Devices for Automobile-Wheels; and I do hereby declare the following to be a full, clear, and exact description of the invention, such as will enable others skilled in the art to which it appertains to make and use the same.

My invention relates to an improvement in apparatus for utilizing the power from an automobile engine for light work, such as grinding or fitting crank shafts of gasolene engines to their bearings, turning lathe, grindstone, sawing wood, etc., and other uses to which such power device may be applied, particularly on a farm, and it consists in the details of construction as will be more fully described and pointed out in the claims.

In the accompanying drawings; Figure 1 is a view in side elevation of a wheel showing my attachment applied thereto, and Fig. 2 is a view in end elevation parts being in section.

In using the attachment, the rear axle and its wheels of an automobile are jacked up and the tire of one of the wheels is preferably removed. This tire, in many of the wheels used is of the demountable rim type in which the rim is held in place by clips carried by bolts secured to the wheel felly, and is removed by unscrewing the nuts and withdrawing the clips thus leaving the rim free to be removed, if desired.

The bolts 5 employed for holding the clips are however permanently attached to the wheel, and if necessary these bolts may be attached to the felly of a wheel of a type in which the rim is not secured by clips. These bolts 5 which are secured to the felly 6 constitute the supports for the arms 7 which latter are preferably of sheet steel and are secured permanently or adjustably at their outer ends to the hub 8 carrying the drive shaft 9. There is one arm 7 for each screw 5 and the several arms together with the hub constitute the driving attachment which may be readily and quickly secured to the wheel felly 6. The arms converge outwardly so as to clear the hub 10 of the wheel and also to locate the transmission device, whatever it may be, sufficiently far from the side of the automobile so as to be out of the way of the latter, and are secured at their ends to an outwardly projecting conical or inclined annular flange 11 formed integral with the hub.

This hub 8 will therefore be held rigid in line with the axis of the rear axle and concentric with the latter, and its shaft 9 may be provided with a pulley as shown in dotted lines in Fig. 1, but I prefer to provide it with a universal joint 12 carrying an extension 13 of the shaft which extension is preferably made angular at its ends for the attachment of a coupling employed for connecting the shaft 13 to the shaft of the part to be driven, or to a counter shaft for driving the tool. I prefer to make a direct and positive connection between the shaft 9 and the tool or other part to be rotated as it is difficult, with a temporary motive power such as is herein contemplated, to keep a belt tight and also difficult to properly aline and maintain the alinement of the axle with the shaft of the tool to be driven.

By however interposing a universal joint in the shaft, accurate adjustment and alinement of the parts is not necessary and no serious trouble or inconvenience is caused by vibration of the rear axle due to the temporary and frequently unstable supports on which they are mounted.

The attachment may be readily and quickly removed and readily applied, hence where it is desired to utilize the power of the automobile engine, the car is moved to a point adjacent the tool and the rear end jacked up to elevate the rear wheels after which the attachment can be quickly attached. After it has been used it can be detached and the tire replaced.

Having fully described my invention what I claim as new and desire to secure by Letters-Patent, is:—

1. An attachment for an automobile wheel for utilizing the power of the automobile engine, consisting of a frame adapted to be attached to the wheel felly and carrying a shaft the latter being in sections connected by a universal joint.

2. An attachment for an automobile wheel for utilizing the power of the automobile engine consisting of a series of arms adapted for removable attachment to bolts carried by the felly of the wheel, a hub having a conical flange to which the outer ends of said arms are secured and a shaft rigid with said hub and in alinement with the rear axle of the automobile.

3. An attachment for an automobile wheel for utilizing the power of the automobile engine consisting of a series of arms arranged in conical formation and adapted to be attached at their outer ends to the felly of a rear wheel of the automobile, a flanged hub secured to the other ends of said arms and a two part shaft carried by said hub one of said shaft parts being rigid with the hub and the other part connected to the rigid part by a universal joint.

In testimony whereof I have signed this specification in the presence of two subscribing witnesses.

SAMUEL LILLY.

Witnesses:
J. B. SAWYER,
VERNON PAUL.